(No Model.)
A. LARSON.
SULKY HARROW.
No. 510,071. Patented Dec. 5, 1893.
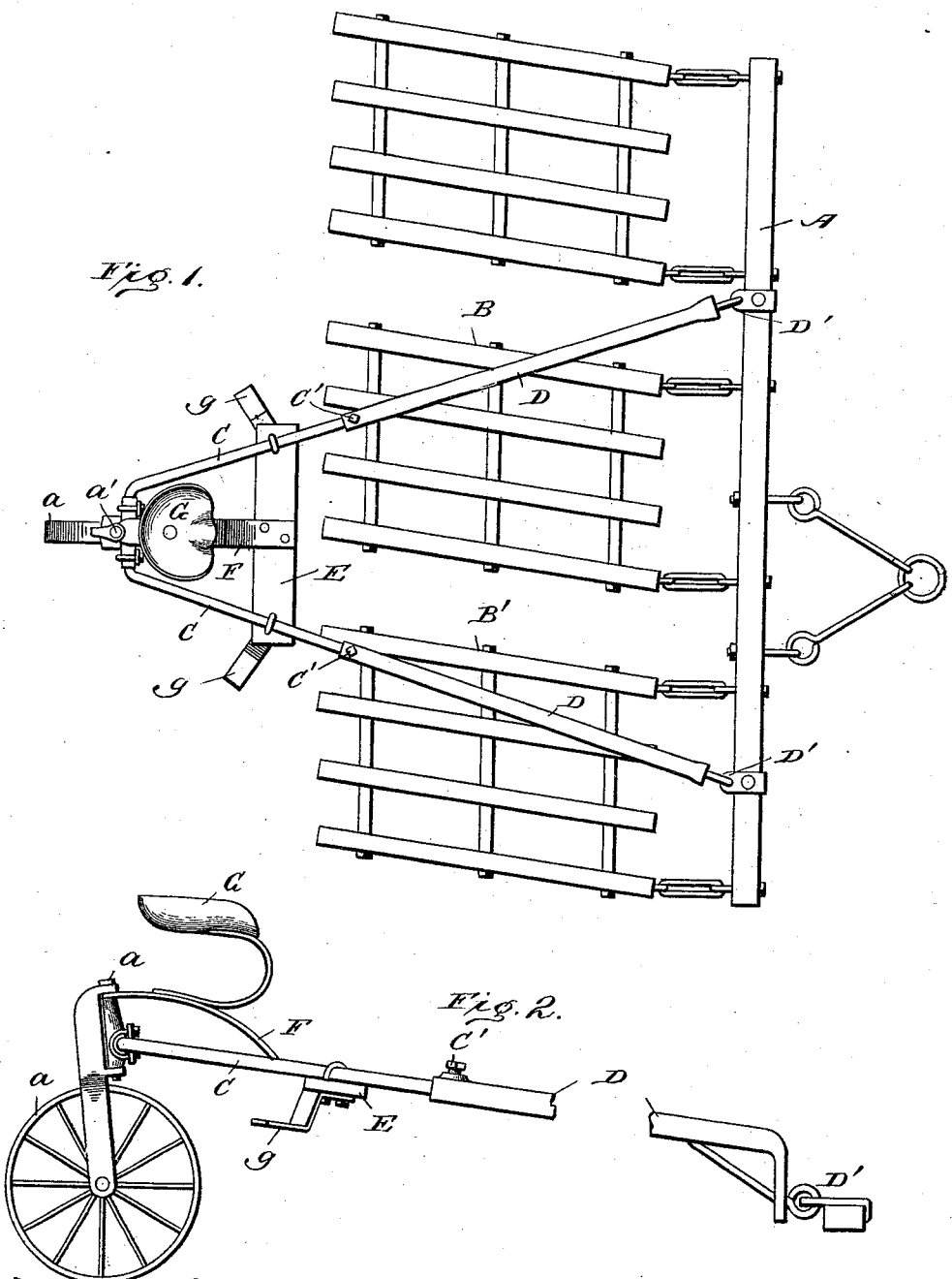
Witnesses
Edwin L. Bradford
Frank H. Thateter
Inventor
Andrew Larson
By Patrick O'Farrell
Attorney

UNITED STATES PATENT OFFICE.

ANDREW LARSON, OF LEXINGTON, NEBRASKA.

SULKY-HARROW.

SPECIFICATION forming part of Letters Patent No. 510,071, dated December 5, 1893.

Application filed April 29, 1893. Serial No. 472,369. (No model.)

*To all whom it may concern:*

Be it known that I, ANDREW LARSON, a citizen of the United States of America, residing at Lexington, in the county of Dawson and State of Nebraska, have invented certain new and useful Improvements in Sulky-Harrows, of which the following is a specification, reference being had therein to the accompanying drawings.

My invention relates to sulky-harrows and consists in the manner of connecting the seat and caster wheel with the draft-bar so the parts may be adjusted to give direction to the harrow sections.

In the drawings, Figure 1, is a plan view showing three harrow sections connected by a draft-bar to which my improved carriage is attached. Fig. 2, is a side elevation of the same, broken for convenience in drawing.

Referring to the parts by reference letters, A indicates the draft-bar and B harrow sections connected therewith. D indicates reach-bars coupled with the draft-bar at D'; the rear end of these bars are hollow or constructed so that the carriage connecting rods C, C, may be adjustably coupled or united with them by any suitable means such as bolts C'; between the connection C I suspend a foot board E, the rear end of the connections being secured to the caster stock at a'. To the bolt upon which the stock swivels is loosely attached a brace or support F, which extends forward and connects rigidly with the foot board E. To the support F the seat G is attached and in the fork of the stock is journaled the wheel a in the usual manner. On either side of the foot board I attach steps for convenience in mounting.

To change the course of the harrow sections so that they will travel in an angular direction the carriage is adjusted to one side of said sections, thereby causing the weight to be increased at the side on which the carriage is placed. The lighter end of the harrow sections when drawn over the field is caused to advance in consequence of the unequalness in weight, and when so advanced gives an angular direction to the harrow sections. It is immaterial upon which side the carriage is placed as it will be readily seen that upon adjustment to either side the desired result will be produced. The adjustment of the carriage is effected by telescoping the connecting rod in the reach bar upon the side on which the carriage is to be placed; the reach-bars being pivotally connected to the draft-bar A allowing them to swing in any direction. When it is desired to adjust the carriage centrally, the connecting rods C C are adjusted equally in the reach-bars D D.

Having thus described my invention, what I claim as new, and desire to secure by Letters Patent, is—

1. In a sulky harrow, the combination of the carriage and the connecting rods with the hollow reach-bars and draft-bar, substantially as and for the purpose set forth.

2. In a sulky harrow the combination of the carriage having a swiveling stock and a wheel mounted therein, of the rigid bars connecting with said stock and supporting the seat and foot board with hollow reach-bars loosely connected to the draft-bar, and means for adjustably connecting them with the carriage connecting bars, substantially as, and for the purpose set forth.

3. The combination of the carriage and draft-bar and means for connecting them by an adjustable coupling so that the coupling may be altered to change the direction of the harrow sections in the manner and for the purpose set forth.

In testimony whereof I affix my signature in presence of two witnesses.

ANDREW LARSON.

Witnesses:
  KATE E. DARR,
  G. B. DARR.